United States Patent
Gray et al.

(10) Patent No.: US 7,565,538 B2
(45) Date of Patent: Jul. 21, 2009

(54) FLOW TOKEN

(75) Inventors: Josh Thomas Gray, Kirkland, WA (US); Naiyi Jiang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1038 days.

(21) Appl. No.: 10/818,431

(22) Filed: Apr. 5, 2004

(65) Prior Publication Data

US 2005/0229239 A1 Oct. 13, 2005

(51) Int. Cl.
*H04L 9/32* (2006.01)
(52) U.S. Cl. .................. 713/169; 713/172; 713/155; 713/153
(58) Field of Classification Search ............ 713/155, 713/153, 169, 172
See application file for complete search history.

(56) References Cited

U.S. PATENT DOCUMENTS

| | | | | |
|---|---|---|---|---|
| 5,961,601 | A * | 10/1999 | Iyengar | 709/229 |
| 6,035,324 | A * | 3/2000 | Chang et al. | 709/203 |
| 6,286,099 | B1 | 9/2001 | Kramer | |
| 6,496,855 | B1 | 12/2002 | Hunt et al. | |
| 6,529,943 | B1 * | 3/2003 | Ohi | 709/206 |
| 6,654,932 | B1 * | 11/2003 | Bahrs et al. | 715/210 |
| 7,027,997 | B1 * | 4/2006 | Robinson et al. | 705/9 |
| 7,035,854 | B2 | 4/2006 | Hsiao et al. | 707/9 |
| 7,100,054 | B2 * | 8/2006 | Wenisch et al. | 713/185 |
| 7,111,789 | B2 * | 9/2006 | Rajasekaran et al. | 235/472.01 |
| 7,188,252 | B1 | 3/2007 | Dunn | |
| 7,240,192 | B1 | 7/2007 | Paya et al. | |
| 7,240,280 | B2 * | 7/2007 | Jolley et al. | 715/234 |
| 7,334,013 | B1 | 2/2008 | Calinov et al. | |
| 7,340,438 | B2 | 3/2008 | Nordman et al. | |
| 7,366,977 | B2 * | 4/2008 | Chokshi | 715/209 |
| 7,415,517 | B1 * | 8/2008 | Schleit et al. | 709/224 |
| 7,428,750 | B1 | 9/2008 | Dunn et al. | |
| 2001/0054155 | A1 * | 12/2001 | Hagan et al. | 713/193 |
| 2002/0066016 | A1 | 5/2002 | Riordan | |
| 2002/0133517 | A1 * | 9/2002 | Carlson et al. | 707/513 |
| 2002/0152384 | A1 | 10/2002 | Shelest et al. | |
| 2002/0184496 | A1 | 12/2002 | Mitchell et al. | |
| 2003/0033545 | A1 * | 2/2003 | Wenisch et al. | 713/202 |
| 2003/0093680 | A1 | 5/2003 | Astley et al. | |
| 2003/0159071 | A1 | 8/2003 | Martinez et al. | |
| 2003/0200202 | A1 * | 10/2003 | Hsiao et al. | 707/3 |
| 2003/0217288 | A1 | 11/2003 | Guo et al. | |

(Continued)

OTHER PUBLICATIONS

De Vivo, Marco et al., "Internet Security Attacks at the Basic Levels", ACM SIGOPS Operating Systems Review, Apr. 1998, pp. 4-15, vol. 32, Issue 2, ACM Press, New York, NY.

(Continued)

*Primary Examiner*—David Garcia Cervetti
(74) *Attorney, Agent, or Firm*—Senniger Powers LLP

(57) ABSTRACT

Managing and securing process flow. A network server receives user data and retrieves secured flow data from the user data. A user interface is rendered at the client in response to the user data. The flow data is based on a web request from the client and identifies the process flow and a position within the process flow. The request initiates the process flow on a data communication network and the user interface has a hidden form field that contains the retrieved flow data. The client posts user-supplied information in addition to the flow data via the user interface for verifying the web request.

29 Claims, 8 Drawing Sheets

U.S. PATENT DOCUMENTS

| | | |
|---|---|---|
| 2003/0226017 A1 | 12/2003 | Palekar et al. |
| 2004/0054887 A1 | 3/2004 | Paulsen, Jr. et al. |
| 2004/0186901 A1 | 9/2004 | Guigui |
| 2005/0216582 A1* | 9/2005 | Toomey et al. .............. 709/224 |
| 2006/0004772 A1* | 1/2006 | Hagan et al. .................. 707/10 |
| 2006/0005018 A1* | 1/2006 | Alculumbre ................ 713/165 |
| 2006/0200566 A1* | 9/2006 | Ziebarth .................... 709/227 |
| 2007/0271382 A1* | 11/2007 | Douiri et al. ................ 709/227 |

OTHER PUBLICATIONS

Zao, John et al., "A Public-Key Based Secure Mobile IP", Proceedings of the 3rd Annual ACM/IEEE International Conference on Mobile Computing and Networking, 1997, pp. 173-184, ACM Press, New York, NY.

* cited by examiner

FIG. 4A

```
┌─ SERVICE A MAIL-MESSAGE                                    _ □ ×
│ FILE  EDIT  VIEW  FAVORITES  TOOLS  HELP
│ ⬅ BACK ▼ ⊙ ▼ ⊠ 🗒 🏠  🔍 SEARCH ★ FAVORITES ⊙ MEDIA ⊙ | ⊠ ▼ 🖨 🗐 □ ▯
│ ADDRESS  ⌂ HTTP://...                              ⇒ GO | LINKS »
│ SERVICE SEARCH[         ] ⊠ SEARCH WEB
│   ┌─────────────────────────────────────────────────────┐
│   │  HOME                                               │
│   │ ┌─────┬──────────┬───────────────┬──────────────┬─────────┬─────────┐
│   │ │HOME │KIDS HOME │MEMBER SERVICES│SITE DIRECTORY│ PRIVACY │ SIGN IN │
│   │ └─────┴──────────┴───────────────┴──────────────┴─────────┴─────────┘
│   │  ┌───────────────────────────────────────────────┐
│   │  │ RESET YOUR PASSWORD (STEP 1)                  │
│   │  │ TO RESET YOUR SERVICE A PASSWORD, PLEASE ENTER THE FOLLOWING
│   │  │ INFORMATION AND THEN CLICK CONTINUE..
│   │  │ E-MAIL ADDRESS    [JOSH@A.COM            ]
│   │  │ COUNTRY/REGION    [UNITED STATES       ⊠]
│   │  │ STATE             [ALABAMA      ⊠]
│   │  │ ZIP CODE          [            ]
│   │  │                          [ CONTINUE ]
│   │  └───────────────────────────────────────────────┘
│   │   MEMBER SERVICES   TERMS OF USE   PRIVACY STATEMENT
│   └─────────────────────────────────────────────────────┘
```

FIG. 4B

```
SERVICE A MAIL-MESSAGE                                    _ □ ☒
FILE  EDIT  VIEW  FAVORITES  TOOLS  HELP
← BACK ▾ → ▾ ☒ ☑ ⌂ | 🔍 SEARCH ☆ FAVORITES ⏵ MEDIA 🔊 | ✉▾ 🖨 📄 □ □
ADDRESS | 📁 HTTP://...                              | ⇨ GO | LINKS »
SERVICE SEARCH |              ▾ SEARCH WEB
```

HOME

| HOME | KIDS HOME | MEMBER SERVICES | SITE DIRECTORY | PRIVACY | SIGN IN |

RESET YOUR PASSWORD (STEP 2)

*TO RESET YOUR SERVICE PASSWORD, PLEASE ENTER THE FOLLOWING INFORMATION AND THEN CLICK CONTINUE..*

SECRET QUESTION     MOTHER'S MAIDEN NAME
SECRET ANSWER     [_____]
NEW PASSWORD     [_____]
                           SIX-CHARACTER MINIMUM; NO SPACES
RETYPE NEW PASSWORD [_____]

[ CONTINUE ]

MEMBER SERVICES    TERMS OF USE    PRIVACY STATEMENT

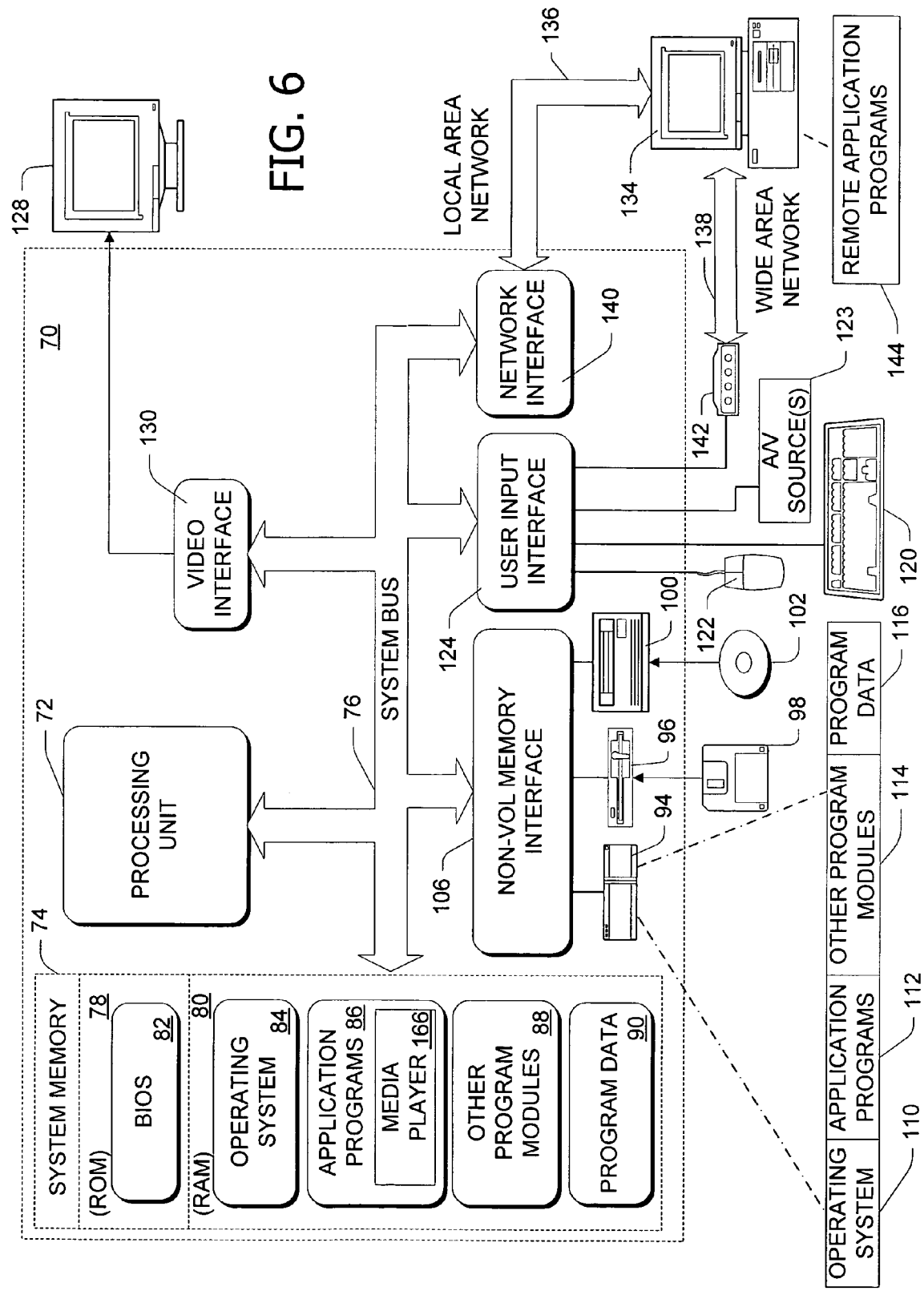

FLOW TOKEN

TECHNICAL FIELD

Embodiments of the present invention relate to the field of computer security. In particular, embodiments of this invention relate to defending against security attacks on a web service, such as spoofing attacks posted directly to a post acceptor.

BACKGROUND OF THE INVENTION

Web sites, such as Internet sites, often provide information, products, services, and the like to their users. Unfortunately, these web sites may be subject to one or more types of security attacks. When a user on a client computer communicates with a web server computer, there is often a need to share information (e.g., authentication information) between the client and the server. For instance, many web sites require users to "register" before their web servers will grant access, to the users. Transactional communications such as these between a client computer and a server computer are at risk of interception or circumvention by a third party.

Presently available authentication services, for example, allow a user to maintain a user account and password for accessing information. The user uses his or her user account and password to access a company intranet, a web server or service, or a private database. As users increasingly rely on authentication services to provide user validation functions, trust has become essential to the success of many of these services. There is also an important trust between the user and an application to which the user is willing to provide credentials. Trustworthiness is affected in part by the steps taken to improve the security of a web service such as an authentication service. A key component in the security of the service is the security of individual user accounts. Penetrating even a single user account can cause a loss of trustworthiness and confidence in the service along with disclosure of confidential user information.

One type of attack is referred to as a "spoofing" attack. A spoofing attack is an attack that attempts to con one or more users into making security decisions based on a misleading context. This is often in the form of a single web page interface, but can be as involved as an entire web site (or several web sites). This type of attack is especially dangerous because the user is lulled into a false sense of security into a context that is completely controlled by an attacker. The goal for an attacker can range from communicating misleading information to compromising security credentials and other personal information from users. The fundamental trust between the user and the application is leveraged and ultimately violated in spoof attacks. There have been high profile attacks against existing web sites in which user profile data and financial information have been compromised. Transactional communications between client and server are also at risk of being partially or fully circumvented by an attacker attempting to reach an end result without having completed a required process or having provided all required information.

Web spoofing poses a threat to both businesses and end users as authentications or other process flows through web pages become more pervasive. Authentication systems play a critical role in enabling products and services. Web spoofing attacks designed to capture credentials, for example, not only compromise individual user accounts, but also compromise the security of the entire authentication system. In particular, in a single sign-in authentication service, compromise of user credentials results in compromise of credentials at nearly all affiliated sites simultaneously. Users have been educated to expect to see authentication system login pages at increasing locations (e.g., inline sign-in) and to type their password when prompted; therefore, a new unexpected location (e.g., a spoofed location) is not surprising to the user. Any web spoofing attack on an authentication service decreases the trustworthiness of the authentication service. There is a need for tools to help users defend themselves against this kind of attack.

Existing defenses against spoofing attacks primarily focus on user education as the key to combating web spoofs. In other words, spoof detection often requires human intervention. While an informed user base is beneficial, education alone is not sufficient to detect and prevent web spoofing. Contrary to conventional wisdom, reading the address bar in the browser or verifying a secure sockets layer (SSL) certificate is not enough to verify the identity of a website. These tools have been shown to be ineffective at solving the web spoofing problem. For example, an attacker can spoof the web browser itself and show a spoofed address bar, status bar (including SSL lock icon) as well as the SSL dialog. That is, a user reading the address bar and the SSL certificate can still be easily spoofed by an attacker. More specifically, a spoof attacker may take advantage of a legitimate context to help persuade the user of the attack's validity. For example, if an attacker successfully sends an HTML e-mail to a user's e-mail inbox, the content will be rendered in a browser window that legitimately shows the surrounding context of the e-mail service, such as the service's address in the address bar. This context helps the attacker's nefarious mail gain false credibility with the user.

Moreover, investigating the problem by viewing suspicious web pages and taking action based on the investigation is time consuming, expensive, and typically identifies spoofing attempts only after such attempts have successfully fooled one or more users.

Other conventional mechanisms to prevent web spoofing require modifications to the browser software or involve client downloads. However, a majority of users have ignored such systems by failing to download the software modifications. There is a need for a web spoofing solution for users who use a dumb client (e.g., web browser) and will not download additional software. The problem of web spoofing remains given that user education is not enough and that users will not download client software.

FIGS. 1A and 1B demonstrate exemplary spoof attack user experiences according to the prior art in which an attacker leverages a trusted context (i.e., a context with which a user is already familiar). FIG. 1A shows the way a typical e-mail message may be displayed in an electronic inbox. According to this example, a spoof e-mail is sent when an attacker mails an HTML message requesting information from the user such as login name and password.

The exemplary e-mail user interface (UI) of FIG. 1B, shows up in the context of the user's e-mail account and e-mail service provider. Depending on the attacker's level of sophistication, the UI may be made to closely resemble the look of a legitimate maintenance page from the e-mail service provider to the user for display in the user's e-mail program's window. Further to the example, a key idea is that a form such as the one shown in FIG. 1B posts to a change password post acceptor. The user is tricked into entering his or her current password while the UI of FIG. 1B has a hidden field containing a new password set by the attacker rather than the user. A class of vulnerability exists in web services where data is posted directly to a post acceptor, perhaps without the user knowing or with the user being tricked by a disingenuous representation. By doing so, the nefarious e-mail may be posting information to the post acceptor, which in turn does something with the user's information or to the user's account other than what the user intended or is aware of.

For these reasons, a system for authentication of a server by a client to improve prevention of fraudulent user interfaces is desired to address one or more of these and other disadvantages.

SUMMARY OF THE INVENTION

Embodiments of the invention overcome one or more deficiencies in the prior art by providing, among other things, improved management of process flow for preventing security attacks on web servers. When a user interacts with a web server, it typically involves the web server rendering a form to a browser operated on a client computer. The user fills out the form with information that is posted back to the web server. In turn, the server accepts and acts on this information. A hostile party (i.e., an attacker) can intercept this information or otherwise trick the user into sending it to the attacker. Aspects of the invention call for the use of flow data in the form of an encrypted flow token to provide a defense against attacks that involve posting directly to post acceptors. The flow token may be an encrypted object containing flow steps and information to be passed that is provided to the user upon requesting, for example, a login page to be rendered on the client. The client then sends the flow token back to the post server. The post server (e.g., an authentication server) can decrypt the flow token and then take the appropriate action. A hostile party in this instance will not have the key to decrypt the flow token and, therefore, cannot misuse the user data. Moreover, this hostile party will not have the key to generate a proper flow token so any spoof that causes the use to submit directly to the post acceptor would be rejected and, thus, prevent the attacker from taking control of a user's account.

Briefly described, a method of managing a process flow embodying aspects of the invention includes receiving a web request. A first server receives the request from a user via a client. In this instance, both the first server and client are coupled to a data communication network and the request initiates the process flow on the network. The method also includes generating secured flow data based on the request and providing a response to the request from the first server to the client via the network. The flow data identifies the process flow and a position within the process flow and the response contains the flow data. The method further includes receiving a user post that contains the flow data from the client and verifying the flow data to verify the request.

Another embodiment of the invention involves a method of managing a process flow on a data communication network. The method includes receiving, at a network server, user data from a client via the network. For instance, the network server is configured to provide one or more services to a user via the client and the client operates a browser configured to permit the user to communicate on the network. The method further includes retrieving secured flow data from the user data received at the network server and causing a user interface to be rendered at the client via the browser in response to the user data. The flow data is based on a web request from the client and identifies the process flow and a position within the process flow. The web request initiates the process flow on the data communication network and the user interface has a hidden form field that contains the retrieved flow data. The client posts user-supplied information in addition to the flow data via the user interface for verifying the web request.

In yet another embodiment, an authentication system includes an authentication server coupled to a data communication network and an authentication database associated with the authentication server. The authentication database stores authentication information for comparison to login information provided by a user for authenticating the user. The database also stores user-specific information identifying the user with respect to one or more services provided by at least one affiliate server coupled to the network. The affiliate server is configured to provide the one or more services to the user via a client coupled to the network. The authentication server is configured to generate secured flow data based on a web request received from the client and to provide a response to the request that contains the flow data. The request initiates the process flow on the network and the flow data identifies the process flow and a position within the process flow. The authentication server is also configured to receive a subsequent user post from the client containing the flow data for verifying the flow data to verify the request.

Computer-readable media having computer-executable instructions for performing methods of preventing spoof attacks embody further aspects of the invention.

Alternatively, the invention may comprise various other methods and apparatuses.

Other features will be in part apparent and in part pointed out hereinafter.

BRIEF DESCRIPTION OF THE DRAWINGS

FIGS. 4A and 4B illustrate exemplary user interfaces for a multi-page web flow.

FIG. 6 is a block diagram illustrating exemplary components of a computer for use in the system of FIG. 2.

Corresponding reference characters indicate corresponding parts throughout the drawings.

DETAILED DESCRIPTION OF THE INVENTION

Figure 2:
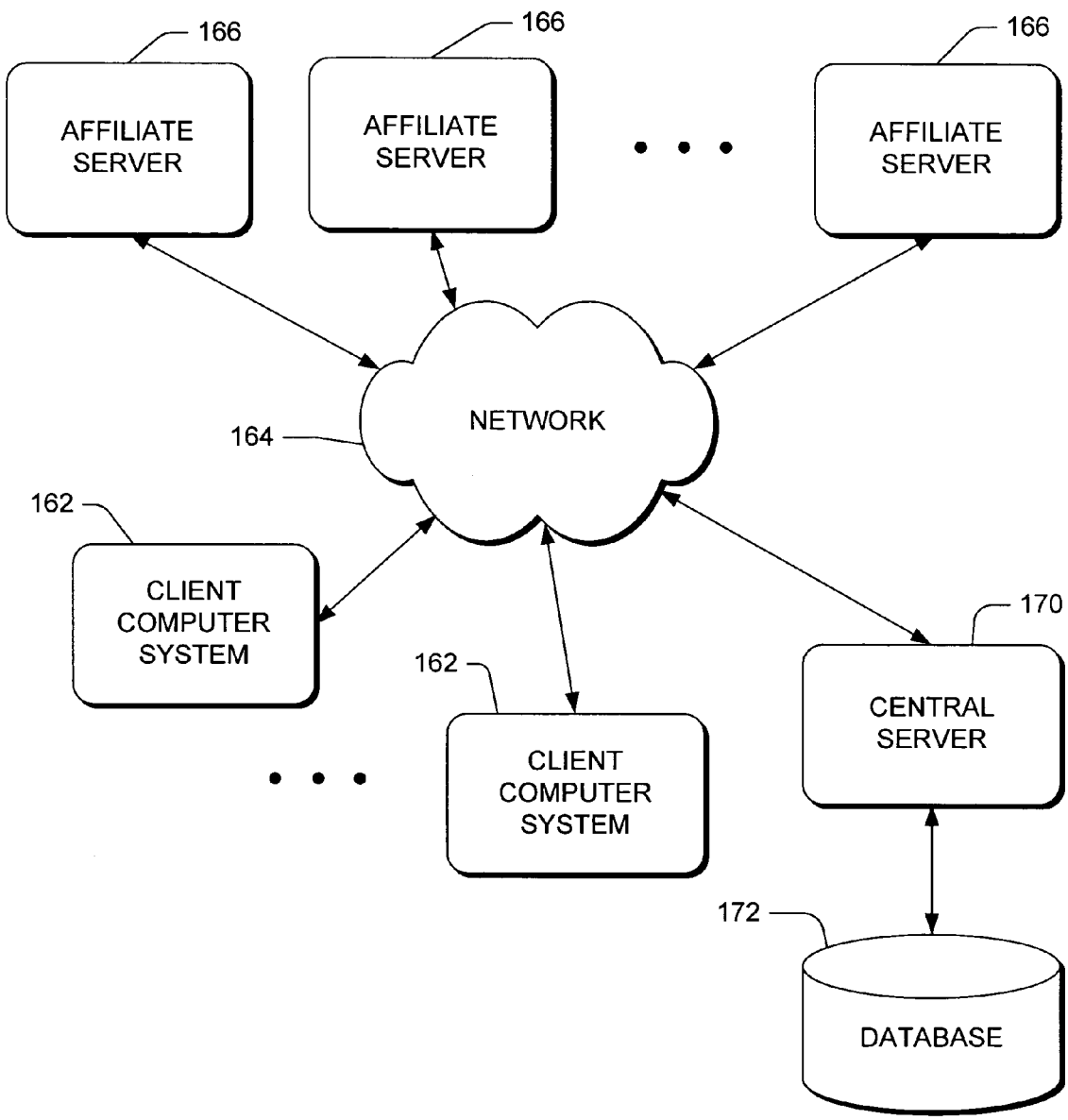
FIG. 2 is a block diagram illustrating an exemplary network environment in which the present invention may be utilized.

Referring further to the drawings, FIG. 2 illustrates an exemplary network environment in which the present invention may be utilized. The invention relates to managing, including securing, process flow among web sites and users. For purposes of illustration, aspects of the invention are applicable to a distributed, multi-site user authentication system (e.g., Microsoft®.NET™ Passport sign-in service). Such service provides a user with the ability to access one or more participating web sites or resources with a single sign-in. Although the participating sites (referred to herein as "affiliates" or "affiliate sites") maintain control over permissions, they use the authentication service rather than hosting and maintaining their own proprietary authentication systems. Those skilled in the art will note that although the invention is described in terms of a multi-site user authentication system, it is contemplated by the inventors that the invention is operable with any type and number of web-based systems, including authentication systems.

In FIG. 2, one or more clients 162 are coupled to a data communication network 164. In this exemplary embodiment of the invention, the network 164 is the Internet (or the World Wide Web). However, the teachings of the present invention can be applied to any data communication network. Multiple affiliate servers 166 are also coupled to network 164. The affiliate servers 166 may be referred to as "web servers" or "network servers" generally.

A central server 170 coupled to network 164 allows communication between itself, the clients 162, and/or the web servers 166. In operation, one or more clients 162 can access affiliate servers 166 via network 164. Although sometimes referred to as an "authentication server" in connection with FIG. 2, the central server 170 in the illustrated embodiment is also a web server capable of interacting with web browsers and other web servers. In this example, server 170, clients 162, and/or servers 166 communicate data among themselves using the hypertext transfer protocol (HTTP), a protocol commonly used on the Internet to exchange information.

FIG. 2 further illustrates a database 172 coupled to server 170. In one embodiment, the database 172 contains information (i.e., credentials) necessary to authenticate a registered user of one of the clients 162 (as well as other users on the network). The database 172 also maintains a profile store for registered users and identifies which elements of the user profile information should be provided to a particular affiliate server 166 when the user accesses its service. In general, a credential is a means for generating an authenticated reference to a single account identifier. For example, an EASI (E-mail As Sign-In) sign-in name and password, a mobile phone number and PIN, and a biometric signature are all credentials that can be associated with the same profile data.

Although database 172 is shown in FIG. 2 as a single storage unit separate from central server 170 for convenience, it is to be understood that in other embodiments of the invention, database 172 may be one or more memories contained within or separate from server 170. In a federated environment, for example, a plurality of servers 170 may be used to provide authentication, shared services management, policy and permissions management, and the like.

The server 170, as described herein, may be part of an authentication system that authenticates a user of client computer 162 seeking access to a particular one of the affiliate servers 166. In this embodiment, server 170 first requests authenticating login information from the user, such as the user's login ID and password. If the user is successfully authenticated, the server 170 of FIG. 2 routes the user's client computer 162 to the appropriate affiliate server 166 for performing a desired service for the user. Using a multi-site user authentication system (e.g., Microsoft®.NET™ Passport single sign-in service), a web user can maintain a single login ID (and associated password) for accessing multiple, affiliated web servers or services. Such a system permits the user to establish a unique account identified by, for example, an e-mail address.

Prior to executing the authentication process, both the user of client 162 and the operator(s) of affiliate servers 166 "register" with server 170 of FIG. 2. This registration is a one-time process that provides necessary information to the authentication system. The user of client 162 registers with server 170 by providing information about the user and/or client 162, such as, the user's name, mailing address, and e-mail address. As part of the user registration process, the user is assigned (or selects) a login ID, which is a common login ID, used to access any affiliate server (e.g., server 166). The login ID may also be referred to herein as a "username," "member name," or "login name". Additionally, the user selects a password associated with the login ID that is used for authentication purposes. After registering and logging into server 170, the user can visit any affiliate server 166 (i.e., affiliate servers that are also registered with the same authentication server) without requiring any additional authentication and often without re-entering user information that is already contained in the associated user profile. The present invention sets forth identifying the user account, or profile, by a unique account identifier.

The central server 170 of FIG. 2, i.e., the authentication server in this embodiment, validates the username/password provided by the user. Server 170 handles the authentication response by comparing the login data to the entries in database 172. If the username and password match an entry in the database 172, the user is authenticated. A unique identifier (e.g., Passport Unique Identifier (PUID)) and a user profile corresponding to the authenticated user are extracted from the database. In this embodiment, when a user registers an account, the account is assigned a PUID that becomes the unique identifier for the account. The PUID is, for example, a 64-bit number that the authentication server sends (e.g., encrypted) to affiliate site 166 as the authentication credential when the user signs in. This unique identifier makes it possible for the site to determine whether the user is the same person from one sign-in session to the next.

Although described in the context of an authentication process flow, aspects of the present invention is useful for mitigating attacks to any of a number of process flows (e.g., an account maintenance flow).

Figure 1A:
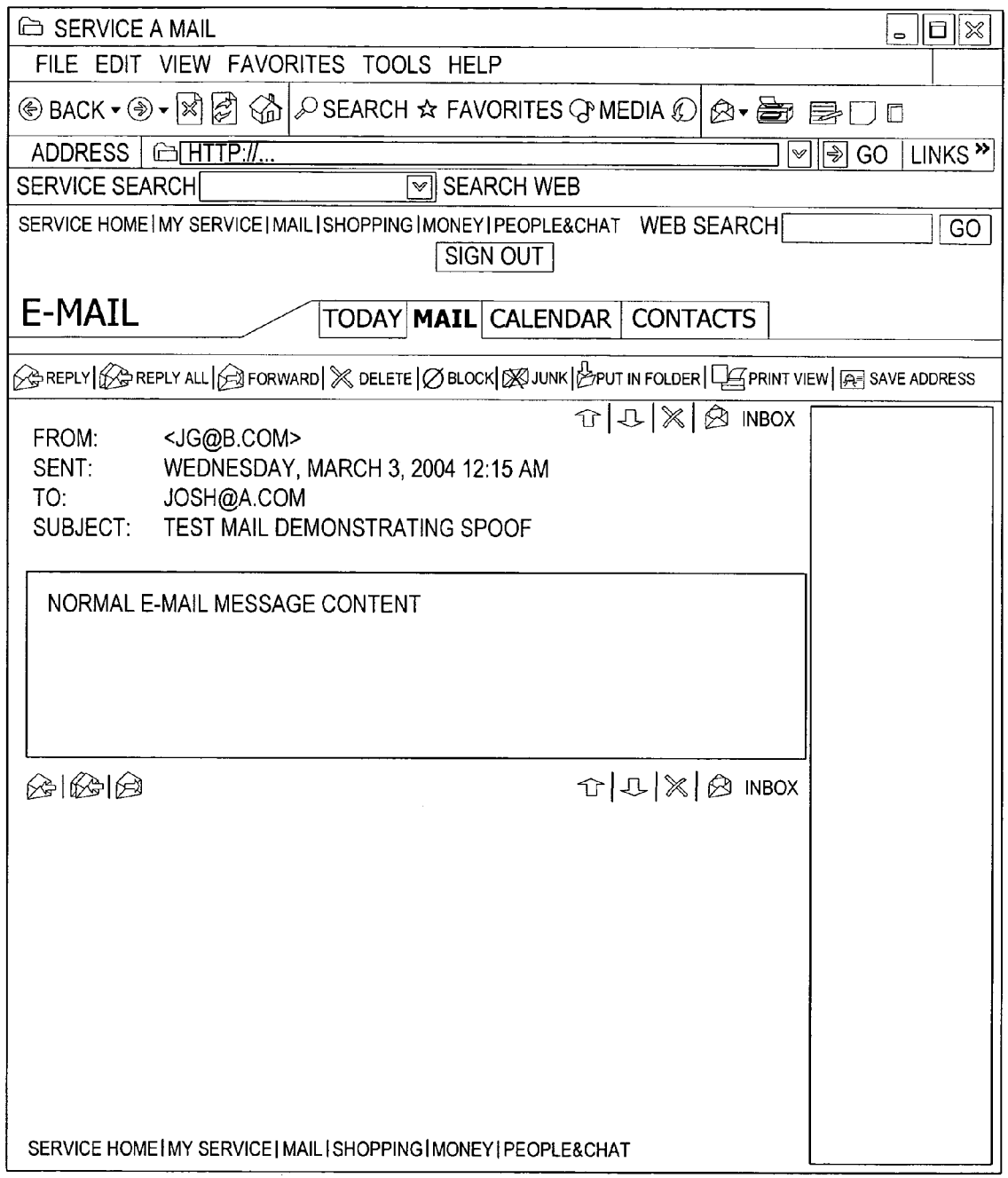
FIGS. 1A and 1B illustrate exemplary user interfaces for a single page spoof attack according to the prior art.
Figure 1B:
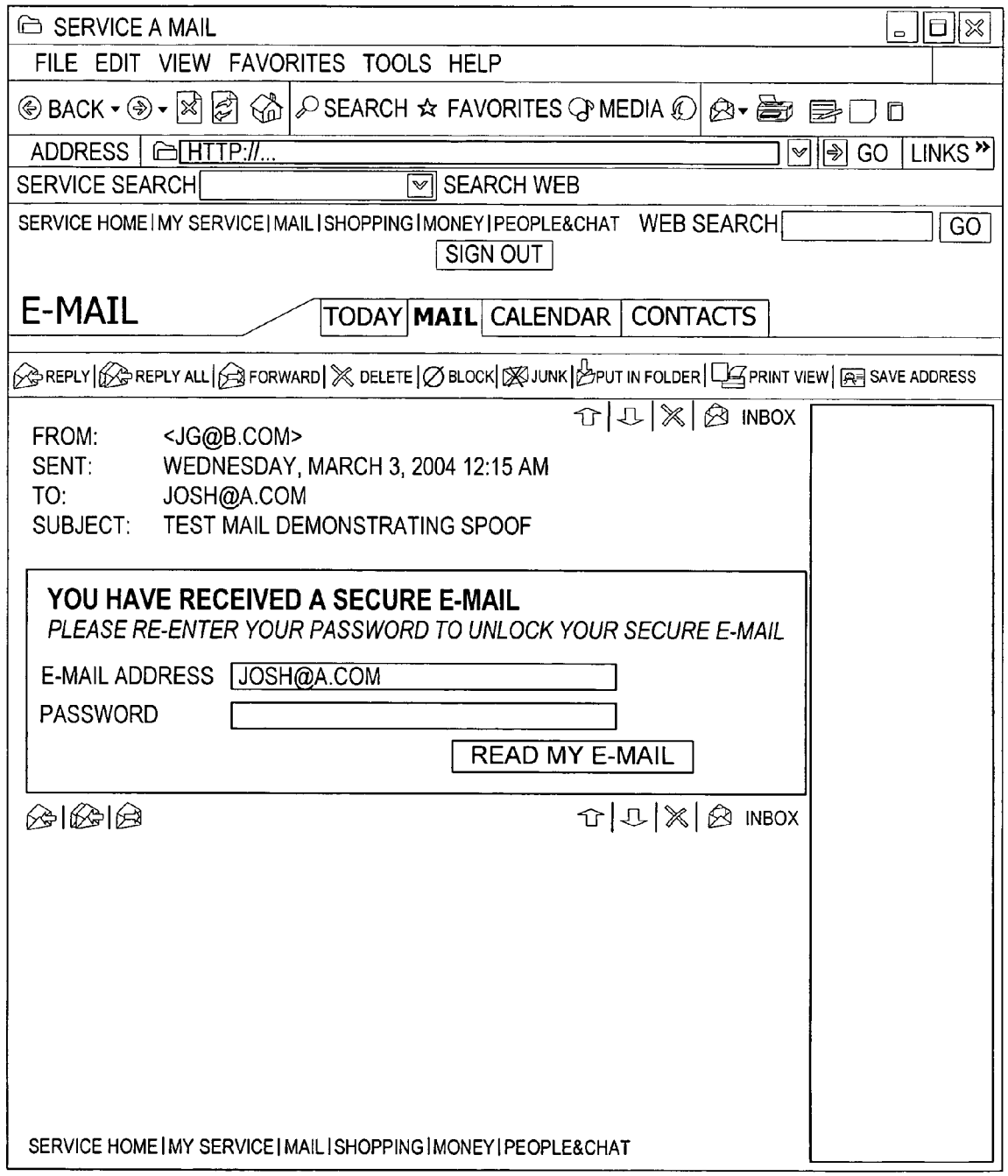

As described above, FIGS. 1A and 1B demonstrate exemplary spoof attack user experiences prevented by the present invention. When a user interacts with web servers, even in relatively simple cases, the interaction typically involves the web server rendering a form to the user's browser. The user fills out this form with information, which is typically posted back to the web server. The web server accepts this information and acts on it. Regarding embodiments of the present invention, a "post acceptor" performs this act of accepting posted information. In more complicated flows, a typical user activity may involve filling out several forms in sequence, each with a form rendered and data posted back to a post acceptor. The data from initial forms/postings may effect and/or be relevant to later posts.

According to embodiments of the invention, flow data in the form of a flow token 180 (e.g., see FIGS. 5A and 5B) provides a defense against attacks that involve posting directly to post acceptors and/or entering web flows out of the expected sequence in multi-page flows. In addition, the flow token 180 provides a mechanism to securely transit information along multi-page flows between requests.

Advantageously, the present invention in at least one of its forms permits law enforcement to more easily track down an attacker by following the trail of where the spoof is hosted, or where the spoofed pages are sending the credentials. To get around this, an attacker may have the spoof submit partially modified user information to the legitimate account management servers (e.g., to change the password). This allows the attacker, for example, to take possession of the account by setting the password to anything the attacker wants without presenting a trail of credential delivery for law enforcement to follow. The present invention is particularly well suited for mitigating this class of spoof attack.

In one embodiment of the present invention, flow token 180 is an encrypted data blob that is rendered as a hidden field on any rendered web form and posted back to the post acceptor (e.g., server 170) for that web form. Server 170 in this instance generates flow token 180 and encrypts it using, for example, a symmetric key specific to the web server 166 so that it is not easily spoofed. It is to be understood that using an asymmetric key for encryption and/or cryptographically signing may be desired, particularly for architectures where the server rendering a form is separate from the server accepting the post. In general, flow token 180 contains at least standard elements for flow/step-in-the-flow identification.

Figure 3:
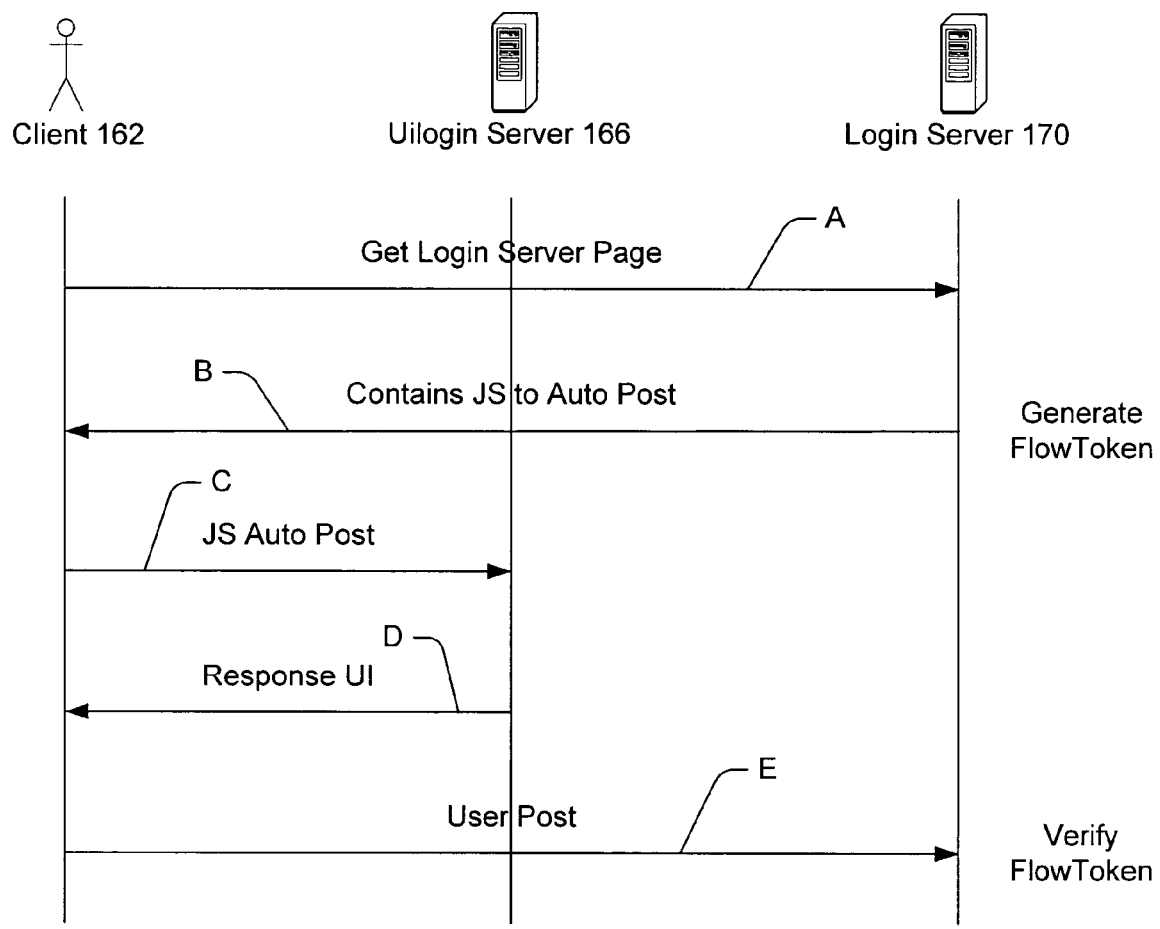
FIG. 3 is an exemplary flow diagram illustrating process flow according to one embodiment of the invention.

FIG. 3 is an exemplary flow diagram illustrating an implementation of the present invention and the interaction between server 170, at least one of the clients 162, and at least one affiliate server 166. The lines in FIG. 3 labeled "A" through "E" represent the flow of information or activities during the process. The arrows on the lines indicate the direction of the process flow. In this example, the label "A" represents the beginning of the processes and the label "E" represents the end of the process.

In the exemplary process of FIG. 3, aspects of the invention provide, among other things, improved management of process flow for preventing security attacks on central server 170 (shown here as a login, or authentication, server). When client 162 interacts with server 170, it typically involves rendering a form to a browser operated on client 162. The user fills out the form with information that is posted back to server 170. In turn, server 170 accepts and acts on this information. This process flow may be used for authentication, account management (e.g., changing password, secret question, secret answer, etc.), and the like. In order to prevent a hostile party (i.e., an attacker) from intercepting this information or otherwise tricking the user into modifying his or her account, for example, for the attacker's benefit, embodiments of the invention call for the use of flow data in the form of the encrypted or hashed flow token 180 to provide a defense. Flow token 180 may be an encrypted object containing flow steps and information to be passed that is provided to the user upon requesting, for example, a login page to be rendered on client 162. Client 162 then sends flow token 180 back to the post server (e.g., an authentication server such as server 170). Server 170 can decrypt flow token 180 and then take the appropriate action. A hostile party in this instance will not have the key to decrypt flow token 180 and, therefore, cannot misuse the user data. Also, a hostile party cannot generate false flow tokens that will be accepted by legitimate post acceptors to make changes to the user's account to the attacker's benefit.

FIG. 3 shows an example of authentication server architecture. Basic page flow with flow token 180 begins when a user accesses a page in the login server (i.e., server 170) (see A). If authentication is required for accessing this page, the required authentication should be already done here. The user could come to this page, for instance, from a link on a member services page. Login server 170 generates the encrypted flow token 180 and sends it to client 162 (see B). Thus, login server 170 knows the specific flow data needed to include in flow token 180. Flow token 180 will be packaged inside encrypted UI parameters and sent to the user's browser as an auto post JS in one embodiment. Different keys may be used to encrypt the UI parameters and the flow token 180. In turn, the browser of client 162 posts encrypted UI data containing flow token 180 to the network server 166 (see C). Server 166 retrieves flow token 180 from the encrypted UI data and adds the flow data to a hidden form field in a response UI page (see D).

In the example of FIG. 3, network server 166 causes the page to be rendered to the user at client 162 for collecting information from the user. The rendered page contains the hidden post parameter carrying the flow token 180 in the illustrated embodiment of the invention. Proceeding with the process flow, the user submits the completed response UI page to post his or her data along with flow token 180 to the post acceptor in server 170 (see E). The post acceptor of server 170 decrypts the posted flow token 180 and verifies the validity of the decrypted data.

Though flow data in the form of flow token 180 may be posted as a hidden form parameter and is particularly well suited for protecting web flows, embodiments of the present invention may be used to protect other multi-leg protocol handshakes. Flow token 180 may be carried anywhere that is appropriate for the application protocol. For normal web traffic, this typically means either as a hidden form variable or on the query string as a parameter.

The steps described with respect to FIG. 3 may be repeated if there are multiple stages in a flow. FIGS. 4A and 4B are exemplary user interfaces for a multi-page web flow that would be vulnerable if an attacker could somehow skip a portion of the flow. FIG. 4A shows a UI for a password reset process that demonstrates a multiple page flow. For example, the first page collects some information from the user's profile. As illustrated in FIG. 4B, the second page collects additional information pertaining to the reset: This is a clear example of how an attacker could circumvent the need to correctly know information such as the state and zip code on the account under attack by directly entering the flow at the second page. Thus, in such an attack, the amount of information that the attacker must know for a successful attack is significantly less.

There are many flows between server 170 and one or more servers 166. In some cases there is only one UI page used in a flow. In other cases, there are multiple UI pages and steps involved in a flow. The pages in the network server 166 post data collected from a user to the post acceptors in the central server 170. According to an embodiment of the invention, server 170 posts UI parameters to network servers 166. In the described cases, the post acceptors need to ensure that the posted data is valid to protect the flows. If a flow is not protected, an attacker could post bogus data directly to the post acceptor of server 170.

For example, the user might partake in an account maintenance flow such as changing his or her password. The user would contact central server 170 via client 162. The central server 170 would issue one or more pages asking the user for information necessary to perform the account maintenance activity (e.g., re-type the current password in the case of changing a password). Central server 170 in this example would also additional information to support the account maintenance (e.g., the new password) and finally perform the operation on the user's behalf. This is important because the flow-interception and spoof protection for this invention helps guard these types of account maintenance operations on behalf of the user.

Figure 5A:
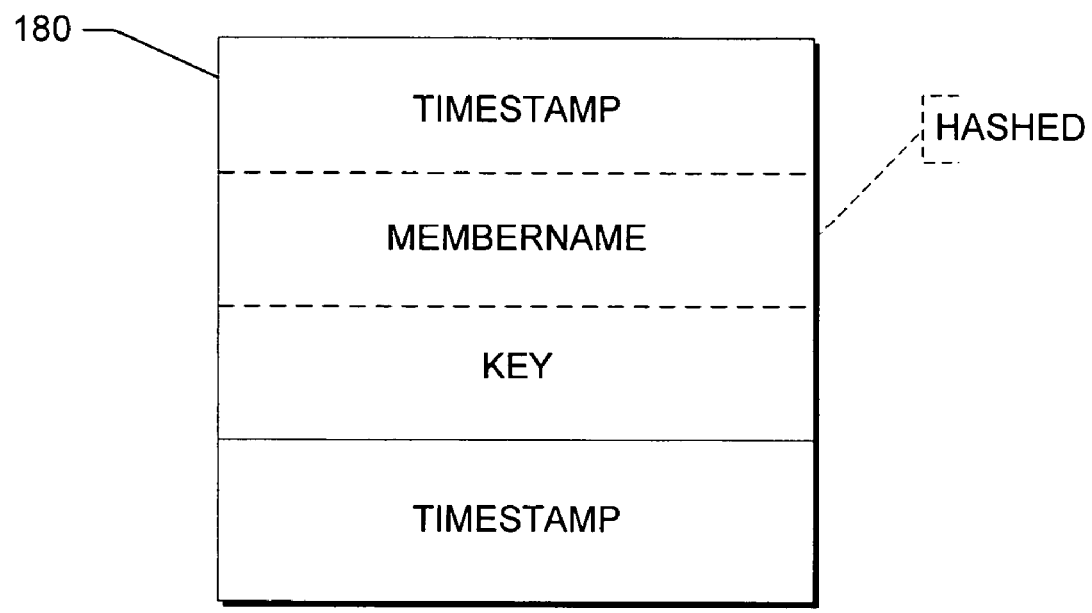
FIGS. 5A and 5B are block diagrams illustrating exemplary flow tokens according to embodiments of the invention.
Figure 5B:
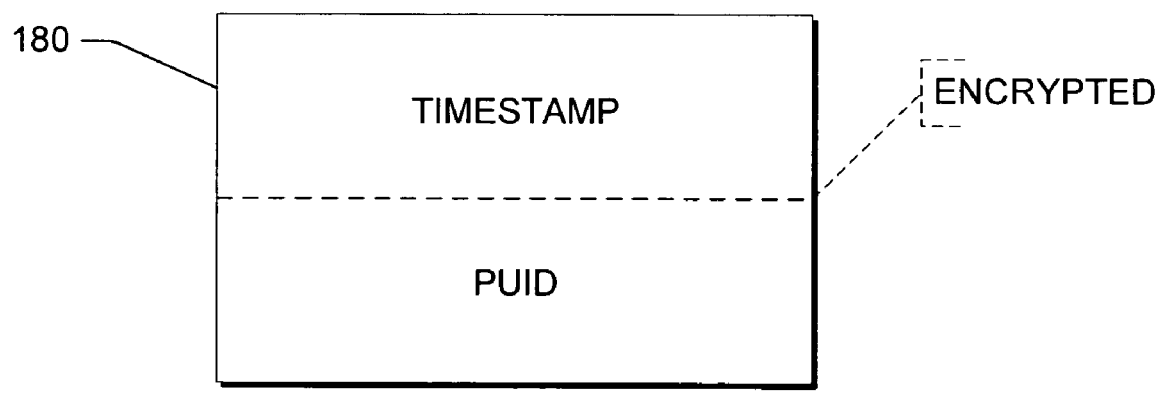

FIGS. 5A and 5B are block diagrams illustrating exemplary computer-readable media in the form of flow tokens according to embodiments of the invention. Security and trustworthiness are fundamental concerns of network computing. Noteworthy attacks on some public web properties have involved posting directly to post acceptors without the user's direct knowledge. Flow token 180 is a key means of defending against these types of vulnerabilities. Inside the encryption, flow token 180 contains, for example, standard elements for flow/step-in-the-flow identification, time stamps for replay prevention, fields for activity and/or identify affinity, as well as an opaque payload for the application layer above it to pass along any information related to the flow in a secure manner. To protect process flows, a hidden form field containing flow token 180 may be used.

The example of FIG. 5A shows flow token 180 for use in a multiple page reset password flow having the following format:

MD5Hashed(timestamp+membername+key):timestamp

Another example, as shown in FIG. 5B, is a change password and change secret question/secret answer flows where a different flow token 180 has the following formate:

Encrypted (timestamp+puid)

In one embodiment, request handlers handle all flows. One request handler handles single process flow and another handles multiple process flows. Each request handler starts with some input data, processes the request, and produces outcome (success or failure). It is useful to turn on or off a flow when it starts and to report some flow data (e.g., PUID, flow name, member name, outcome, etc.). As an example, a generic CFlow class in pphandler provides the following functionalities: turning on/off a flow (e.g., http, non-http, Soap API); reporting certain flow data; and generating and verifying flow token 180 that can be used for different flows. This class and other helper methods may be added to the infrastructure so that flow token 180 can be added to all form pages and checked in all post acceptors. Flow data refers generally to data associated with a flow such as flow ID, member name, member PUID, outcome, etc. and particularly an encrypted blob used as, for example, a hidden form field.

In yet another embodiment, flow token 180 has the following basic format:

Encrypted(RawFlowToken Data)

With respect to flow disabling and data reporting, when a request reaches a request handler, several steps are performed according to embodiments of the invention. First, when the flow ID is set, a method is called to check the status of the flow. If the flow is disabled, the action might be to redirect the user to a flow disabled error page in http case or to return an error code in non-http case. Various flow data set methods may be called to initialize the flow data (e.g., flow ID, flow page ID, membername, member ID, and client GUID). When the request is handled, flow set methods will be called to save the flow results (e.g., flow result and flow outcome). The flow get methods may be used to supply flow report data needed by the flow report system. Advantageously, embodiments of the present invention permit disabling flows at various granularities (e.g., whole flow, subflow, handler, page, server, SOAP API level, etc.).

With respect to flow token validation rules, when one of the following errors occurs, validation fails and the appropriate actions are taken: missing flow token; invalid flow token; time window expired; flow ID does not match the expected flow ID; page ID does not match the expected Page ID; PUID does not match the expected PUID; and other user data does not match the expected user data. The default action may be to display a generic error page.

In the foregoing example, the policy for the flow is checked and, if policy dictates that the particular flow is disabled, appropriate action is taken. For instance, a store of generic policy may be checked before loading a particular page/handler or handing a particular Soap API. If it is disabled, the appropriate action is taken.

APPENDIX A summarizes an exemplary flow token format according to embodiments of the invention.

FIG. 6 shows one example of a general purpose computing device in the form of a computer 70. In one embodiment of the invention, a computer such as the computer 70 is suitable for use in generating and encrypting flow token 180.

In the illustrated embodiments, computer 70 has one or more processors or processing units 72 and a system memory 74. In the illustrated embodiment, a system bus 76 couples various system components including the system memory 74 to the processors 72. The bus 76 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 70 typically has at least some form of computer readable media. Computer readable media, which include both volatile and nonvolatile media, removable and non-removable media, may be any available medium that may be accessed by computer 70. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 70. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 74 includes computer storage media in the form of removable and/or non-removable, volatile and/or nonvolatile memory. In the illustrated embodiment, system memory 74 includes read only memory (ROM) 78 and random access memory (RAM) 80. A basic input/output system 82 (BIOS), containing the basic routines that help to transfer information between elements within computer 70, such as during start-up, is typically stored in ROM 78. The RAM 80 typically contains data and/or program modules that are immediately accessible to and/or presently being operated on by processing unit 72. By way of example, and not limitation, FIG. 6 illustrates operating system 84, application programs 86, other program modules 88, and program data 90.

The computer 70 may also include other removable/non-removable, volatile/nonvolatile computer storage media. For example, FIG. 6 illustrates a hard disk drive 94 that reads from or writes to non-removable, nonvolatile magnetic media. FIG. 6 also shows a magnetic disk drive 96 that reads from or writes to a removable, nonvolatile magnetic disk 98, and an optical disk drive 100 that reads from or writes to a removable, nonvolatile optical disk 102 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 84, and magnetic disk drive 96 and optical disk drive 100 are typically connected to the system bus 76 by a non-volatile memory interface, such as interface 106.

The drives or other mass storage devices and their associated computer storage media discussed above and illustrated in FIG. 6, provide storage of computer readable instructions, data structures, program modules and other data for the computer 70. In FIG. 6, for example, hard disk drive 94 is illustrated as storing operating system 110, application programs 112, other program modules 114, and program data 116. Note that these components can either be the same as or different from operating system 84, application programs 86, other program modules 88, and program data 90. Operating system 110, application programs 112, other program modules 114, and program data 116 are given different numbers here to illustrate that, at a minimum, they are different copies.

A user may enter commands and information into computer 70 through input devices or user interface selection devices such as a keyboard 120 and a pointing device 122 (e.g., a mouse, trackball, pen, or touch pad). Other input devices (not shown) may include a microphone, joystick, game pad, satellite dish, scanner, or the like. These and other input devices are connected to processing unit 72 through a user input interface 124 that is coupled to system bus 76, but may be connected by other interface and bus structures, such as a parallel port, game port, or a universal serial bus (USB). A monitor 128 or other type of display device is also connected to system bus 76 via an interface, such as a video interface 130. In addition to the monitor 128, computers often include other peripheral output devices (not shown) such as a printer and speakers, which may be connected through an output peripheral interface (not shown).

The computer 70 may operate in a networked environment using logical connections to one or more remote computers, such as a remote computer 134. The remote computer 134 may be a personal computer, a server, a router, a network PC, a peer device or other common network node, and typically includes many or all of the elements described above relative to computer 70. The logical connections depicted in FIG. 6 include a local area network (LAN) 136 and a wide area network (WAN) 138, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 70 is connected to the LAN 136 through a network interface or adapter 140. When used in a wide area networking environment, computer 70 typically includes a modem 142 or other means for establishing communications over the WAN 138, such as the Internet. The modem 142, which may be internal or external, is connected to system bus 76 via the user input interface 134, or other appropriate mechanism. In a networked environment, program modules depicted relative to computer 70, or portions thereof, may be stored in a remote memory storage device (not shown). By way of example, and not limitation, FIG. 6 illustrates remote application programs 144 as residing on the memory device. The network connections shown are exemplary and other means of establishing a communications link between the computers may be used.

Generally, the data processors of computer 70 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described herein in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 70, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 70 executes computer-executable instructions such as those described herein for managing and securing process flow. Central network server 170 receives user data and retrieves secured flow data from the user data. A user interface is rendered at client 162 in response to the user data. The flow data is based on a web request from client 162 and identifies the process flow and a position within the process flow. The request initiates the process flow on data communication network 164 and the user interface has a hidden form field that contains the retrieved flow data. The client 162 posts user-supplied information in addition to the flow data via the user interface for verifying the web request.

The order of execution or performance of the methods illustrated and described herein is not essential, unless otherwise specified. That is, elements of the methods may be performed in any order, unless otherwise specified, and that the methods may include more or less elements than those disclosed herein.

Information in this document, including uniform resource locator and other Internet web site references, is subject to change without notice. Unless otherwise noted, the example companies, organizations, products, domain names, e-mail addresses, logos, people, places and events depicted herein are fictitious, and no association with any real company, organization, product, domain name, e-mail address, logo, person, place or event is intended or should be inferred.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

Appendix A

Flow Token Data Format:

Encrypted(RawFlowToken Data)

The following table shows exemplary data included in the flow token:

| Field Name | Length | Purpose |
| --- | --- | --- |
| Version | 2-byte | for tracking flow token version |
| FlowId | 4-byte | for identifying flow name |
| PageId(StepId) | 4-byte | for identifying step or page |
| PUID | 8-byte | for identifying member |
| Time Window | 4-byte | for ensuring freshness; preventing replay |
| Payload | Name-value pairs | for other user data |

What is claimed is:

1. A method of managing a process flow on a data communication network, said method comprising:

receiving, at an authentication server, a web request from a user via a client associated therewith, said authentication server and said client being coupled to the data communication network, said web request initiating the process flow on the data communication network;

in response to receiving the web request, generating, at the authentication server, secured flow data based on the web request received at the authentication server, said flow data comprising an identifier for the process flow and a position within the process flow;

providing a response to the web request from the authentication server to the client via the data communication network, said response containing the flow data, wherein the response is redirected to a web server coupled to the data communication network, and wherein the web server retrieves the flow data and causes a user interface associated with the web request to be rendered at the client in response thereto;

receiving, at the authentication server, a user post from the client, said user post being responsive to the user interface and containing the flow data and user-supplied information, wherein the user post is redirected from the web server to the authentication server; and evaluating, at the authentication server, the flow data according to flow validation rules to verify the web request or to determine an error when the web request is not verified for the identified position within the process flow, wherein the process flow is redirected to a predetermined entry point in the process flow when the web request is not verified for the identified position within the process flow based on the error.

2. The method of claim 1, wherein evaluating the flow data includes decrypting the flow data at the authentication server.

3. The method of claim 1, wherein evaluating the flow data includes validating a signature associated with the flow data at the authentication server.

4. The method of claim 1, said user interface comprises a hidden form field that includes the flow data.

5. The method of claim 1, wherein said user interface includes one or more form fields for collecting information from the user, said user interface further including a hidden post parameter carrying the flow data.

6. The method of claim 1, wherein the flow data comprises one or more of the following: a user identifier; a timestamp; a nonce; and a query string parameter.

7. The method of claim 1, wherein the flow data is hidden.

8. The method of claim 1, wherein the authentication server is a login server of a multi-site user authentication system.

9. The method of claim 1, wherein the authentication server is a server providing at least one account management function of a multi-site user authentication system.

10. One or more computer-readable storage media have computer-executable instructions for performing the method of claim 1.

11. The method of claim 1, wherein the process flow represents a series of user posts required to accomplish the received web request.

12. The method of claim 11, wherein the position within the process flow indicates one of the series of user posts required to accomplish the received web request.

13. A method of managing a process flow on a data communication network, said method comprising:

receiving, at a network server, user data from a client via the data communication network, said network server and said client being coupled to the data communication network, said network server being configured to provide one or more services to a user via the client, wherein the client operates a browser configured to permit the user to communicate on the data communication network;

retrieving secured flow data from the user data received at the network server, said flow data being based on a web request received at a central server from the client and identifying the process flow and a position within the process flow, said web request initiating the process flow on the data communication network, wherein the central server is also coupled to the data communication network and the flow data is generated at the central server based on the web request, and wherein the user data is included in a response received at the client from the central server and redirected to the network server; and causing a user interface to be rendered at the client via the browser in response to the user data, said user interface having a hidden form field that contains the retrieved flow data, wherein the client posts user-supplied information to the central server in addition to the flow data via the user interface, wherein the central server evaluates said posted flow data according to flow validation rules to verify the web request or to determine an error when the web request is not verified for the identified position within the process flow, and wherein the central server redirects the process flow to a predetermined entry point in the process flow when the web request is not verified for the identified position within the process flow based on the error.

14. The method of claim 13, wherein the flow data is decrypted at the central server.

15. The method of claim 13, further comprising receiving, at the network server, the user data posted by the browser.

16. The method of claim 13, wherein causing the user interface to be rendered includes generating a response UI page in response to the web request and as a function of the user data and adding the retrieved flow data to a hidden form field of the response UI page.

17. The method of claim 13, wherein the flow data comprises one or more of the following: a user identifier; a timestamp; a nonce; and a query string parameter.

18. The method of claim 13, wherein the central server is a login server of a multi-site user authentication system.

19. One or more computer-readable storage media have computer-executable instructions for performing the method of claim 13.

20. The method of claim 13, wherein the process flow represents a series of user posts required to accomplish the received web request.

21. The method of claim 20, wherein the position within the process flow indicates one of the series of user posts required to accomplish the received web request.

22. An authentication system comprising:
an authentication server coupled to a data communication network;
an authentication database associated with the authentication server, said authentication database storing authentication information for comparison to login information provided by a user for authenticating the user, said authentication database further storing user-specific information identifying the user with respect to one or more services provided by at least one affiliate server coupled to the data communication network, wherein the affiliate server is configured to provide the one or more services to the user via a client coupled to the data communication network;
said authentication server having a processor configured to execute instructions for:
generating secured flow data based on a web request received from the client and providing a response to the web request that contains the flow data, said web request initiating the process flow on the data communication network and said flow data identifying the process flow and a position within the process flow, said process flow representing a series of user posts required to accomplish the received web request, said position within the process flow indicating one of said series of user posts required to accomplish the received web request;
providing a response to the web request from the authentication server to the client via the data communication network, said response containing the flow data and being redirected to the affiliate server, wherein the affiliate server retrieves the flow data from the response and causes a user interface associated with the web request to be rendered at the client in response thereto;
receiving a user post from the client, said user post containing the flow data, said received user post being redirected to the authentication server from the affiliate server and being responsive to the user interface;
evaluating the flow data according to flow validation rules to verify the web request or determine an error when the web request is not verified based on the position included in the flow data; and
disabling a portion of the process flow when the web request is not verified based on the error.

23. The system of claim 22, wherein the processor of said authentication server is further configured to decrypt the flow data for verifying the request.

24. The system of claim 22, wherein the client operates a browser configured to permit the user to communicate on the data communication network and wherein the affiliate server is configured to receive the user post via the browser.

25. The system of claim 22, wherein the response to the received request from the authentication server comprises user data containing the flow data and wherein the affiliate server is configured to retrieve the flow data from the user data, generate a response UI page in response to the web request and as a function of the user data, and to add the retrieved flow data to a hidden form field of the response UI page.

26. The system of claim 22, wherein the user interface is rendered to the user via a browser executed by the client, said user interface including one or more form fields for collecting information from the user, said user interface further including a hidden post parameter carrying the flow data.

27. The system of claim 22, wherein the flow data comprises one or more of the following: a user identifier; a timestamp; a nonce; and a query string parameter.

28. The system of claim 22, wherein the flow data is hidden.

29. The system of claim 22, wherein the client operates a browser configured to permit the user to communicate on the data communication network, and wherein the user interface is rendered to the user via the browser for requesting information from the user, said user interface containing the flow data in a hidden form field.

* * * * *